United States Patent [19]

Todt et al.

[11] Patent Number: 5,663,282
[45] Date of Patent: Sep. 2, 1997

[54] METHOD FOR PRODUCING POLYESTERS

[75] Inventors: Michael Leslie Todt; John William Carbone, both of Schenectady, N.Y.

[73] Assignee: General Electric Company, Schenectady, N.Y.

[21] Appl. No.: 699,216

[22] Filed: Aug. 19, 1996

Related U.S. Application Data

[62] Division of Ser. No. 556,683, Nov. 13, 1995, abandoned.

[51] Int. Cl.$^6$ .................... C08G 63/78; C08L 67/00; C08K 5/10
[52] U.S. Cl. ................. 528/274; 524/601; 524/845; 528/279; 528/283
[58] Field of Search .................. 528/274; 524/601, 524/845

[56] References Cited

U.S. PATENT DOCUMENTS

| 5,191,013 | 3/1993 | Cook et al. | 528/272 |
| 5,300,590 | 4/1994 | Cook et al. | 524/175 |
| 5,356,984 | 10/1994 | Carbone et al. | 524/601 |

OTHER PUBLICATIONS

"The Structures and Reversible Polymerization of Cyclic Oligomers from Poly(ethylene terephthalate)" by Goodman et al. Polymer, 1, pp. 384–396, 1960.

*Primary Examiner*—Tae Yoon
*Attorney, Agent, or Firm*—William H. Pittman

[57] ABSTRACT

A method for preparing rapidly crystallized polyesters from macrocyclic polyester oligomers comprising the step of contacting macrocyclic polyester oligomers, polymerization catalysts and nucleating agents.

8 Claims, No Drawings

METHOD FOR PRODUCING POLYESTERS

This application is a division of application Ser. No. 08/556,683, filed Nov. 13, 1995, now abandoned.

FIELD OF THE INVENTION

This invention is directed to a novel process for making polyesters from macrocyclic polyester oligomers. The process employs nucleating agents which unexpectedly result in improved crystallization rates of the polyesters without interfering with the viscosity and polymerization of the oligomer precursors.

1. Background of the Invention

Polyesters such as poly(alkylene terephthalates) are well known commercially available polymers. They have valuable characteristics including strength, toughness, high gloss and solvent resistance. Polyesters are commercially prepared by the reaction of diols with functional derivatives of dicarboxylic acids, diacid halides or esters. Further, the above-described polyesters may be fabricated into articles by a number of well known techniques including injection and roto molding and extrusion.

In recent years, macrocyclic polyester oligomers have been developed and desired since they have unique properties which make them attractive as matrices for polymer composites. The desired properties stem from the fact that macrocyclic polyester oligomers exhibit low viscosities when compared to those of corresponding polymers. Such low viscosities allow them to easily impregnate dense fibrous preforms.

As a result of their properties, and particularly their low viscosities, it has been of increasing interest to utilize macrocyclic polyester oligomers as precursors for branched and linear polyesters. This is true because macrocyclic polyester oligomers may first be employed to fill a preform, and subsequently polymerized to high molecular weight polyesters displaying the above-mentioned properties.

Notwithstanding the above, when preparing materials from polyester precursors, like oligomers, the rate limiting step of material formation is polymer crystallization which is an important property of many polyesters. As a result of this, the processing time of the polyesters is often long, making them, among other things, difficult to handle while setting/crystallizing.

It is of increasing interest, therefore, to make polyesters via a method which results in improved crystallization rates without interfering with the viscosity and polymerization of the macrocyclic polyester oligomers they are prepared from.

2. Description of the Prior Art

Efforts have been disclosed for preparing polyesters. In U.S. Pat. No. 5,387,666 and 5,039,783, the disclosures of which are incorporated herein by reference, tin catalysts are employed for the preparation of polyesters from macrocyclic polyester oligomers.

Other investigators have focused on the preparation of polyesters. In U.S. patent application Ser. No. 08/369,986, polyesters are prepared by contacting macrocyclic polyester oligomers and a polymerization catalyst at a temperature within the range of about 160°–300° C.

Additionally, attempts have been made to reinforce composite materials. In U.S. Pat. No. 3,812,077, a method for making crystalline polymer fiber composites is disclosed.

SUMMARY OF THE INVENTION

In a first aspect, the instant invention is directed to a mixture comprising (a) a macrocyclic polyester oligomer; and
(b) a nucleating material.

In a second aspect, the instant invention is directed to a process for making polyesters comprising the step of contacting:

(a) a macrocyclic polyester oligomer;
(b) a nucleating material; and
(c) a polymerization catalyst.

Improved crystallization rates are defined herein to mean a crystallization rate which is about 25% and preferably 50% and most preferably about 100% faster than the crystallization rates of polyesters not comprising the nucleating material described in this invention. Such improved crystallization rates are described in the table which follows.

DETAILED DESCRIPTION OF THE PREFERRED EMBODIMENTS

The macrocyclic polyester oligomers which may be employed in this invention are not limited and preferably macrocyclic poly(alkylene dicarboxylate) oligomers comprising structural units of the formula

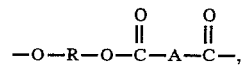

wherein R is an alkylene or mono- or polyoxyalkylene radical containing a straight chain of about 2–8 atoms and A is a m- or p-linked monocyclic aromatic or alicyclic radical. Hence, it is preferred that the macrocyclic polyester oligomers are of the family consisting of polymeric glycol terephthalates or isophthalates and mixtures thereof including copolyesters of terephthalic and isophthalic acids. They are typically characterized by an Mn value of less than about 1500 but preferably about 300 to about 800. Preferred oligomers employed in the instant invention are macrocyclic poly(1,2-ethylene 2,6-naphthalene dicarboxylate) (PEN), poly(ethylene terephthalate) (PET) and especially poly (1,4-butylene terephthalate) (PBT) oligomers and copolyesters comprising the same.

The oligomers may be prepared by a method which comprises contacting at least one diol of the formula HO—R—OH and at least one diacid chloride of the formula

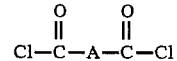

under substantially anhydrous conditions and in the presence of a substantially water immiscible organic solvent, with at least one unhindered tertiary amine; said contact being conducted at a temperature from about −25° to about +25° C.

Other reagents used to synthesize the macrocyclic poly (alkylene dicarboxylate) oligomers employed in the instant invention include unhindered tertiary amines and substantially water-immiscible organic solvents. A detailed description for the preparation of the above-mentioned macrocyclic polyester oligomers employed in this invention may be found in commonly assigned U.S. Pat. No. 5,039,783, the disclosure of which is incorporated herein by reference.

There is no limitation with respect to the catalysts which may be employed in this invention other than that they are those which are capable of accelerating the polymerization of the macrocyclic polyester oligomers described above.

The often employed catalysts include organotin compounds and titanate catalysts. Illustrative organotin compounds are dialkyltin(IV) oxides such as di-n-butyltin(IV) oxide and di-n-octyltin oxide and acyclic and cyclic dialkyltin(IV) dialkoxides such as di-n-butyltin(IV) di-n-butoxide and 2,2-di-n-butyl-2-stanna-1,3-dioxacycloheptane tributyltin ethoxide. Illustrative titanate catalysts include isopropyl titanate, 2-ethylhexyl titanate, tetrakis-(2-ethylhexyl)titanate and titanium(IV) 2-ethylhexoxide.

Other catalysts which may be employed in this invention include dialkyltin alkoxides, stannaoxacycloalkanes and spirotin compounds. Such other catalysts are described in U.S. Pat. No. 5,407,984, the disclosure of which is incorporated herein by reference.

Nucleating material, as used herein, is defined to mean any material capable of initiating crystal growth in the polyesters prepared in this invention, and preferably with the proviso that they do not substantially interfere with the viscosity and polymerization of the macrocyclic polyester oligomer precursors.

The nucleating material can include, for example, any materials which are compatible, incompatible, miscible or immiscible with the macrocyclic polyester oligomer precursors. They may be organic or inorganic materials, metal oxides, mixed metal oxides, salts and polymers, all of which include, among other things, powders, particles and fibers. Such nucleating material is commercially available and/or conventionally prepared, the selection of which may be determined by experimentation.

It is desirable for the nucleating materials of this invention to have a higher melting point than the macrocyclic polyester oligomeric precursors. Moreover, the preferred nucleating agents often include metal oxides like antimony oxide and polymer powders and/or fibers like poly(1,4-butylene terephthalate) powders and fibers.

When preparing the mixtures as described in the first aspect of this invention, the macrocyclic polyester oligomer and nucleating material may be agitated by any conventional means. There is no limitation with respect to the form in which macrocyclic polyester oligomer is in when mixed with the nucleating agent. For example, it may be a solid or powder (if the stirring occurs at ambient temperature) or molten (if the stirring occurs at elevated temperatures).

When conducting the instant novel process as set forth in the second aspect of this invention, a reaction vessel, for example, may be charged with the macrocyclic polyester oligomers, nucleating agent and polymerization catalyst, the order of addition not being material to this invention as long as polymerization can occur in the presence of the nucleating agents. Heat is supplied to melt the oligomers (about 135° C. to about 250° C.) for polymerization and stirring may be employed under an inert gas in order to enhance the polymerization of the oligomers to produce the desired polymer. Additionally, the nucleating agents and polymerization catalysts employed in this invention may first be dissolved in a solvent such as o-dichlorobenzene in order to enhance mixing.

It is also within the scope of this invention, for example, to charge a mold with nucleating material followed by the addition of catalyst and oligomer or a premix thereof. Again, the only proviso being that conditions allow for the polymerization of the macrocyclic polyester oligomers. To this end, in-situ polymerization in a mold or preform, for example, is certainly within the scope of this invention.

Subsequent to the polymerization of the macrocyclic polyester oligomers, the resulting polymers are linear and/or branched polyesters which can include PEN, PET and preferably PBT.

The amount of nucleating material employed in this invention is often about 0.01 to about 15.0 weight percent and preferably about 0.02 to about 5.0 weight percent and most preferably about 0.1 to about 2.0 weight percent based on total weight of oligomer, including all ranges subsumed therein. The amount of polymerization catalyst employed in this invention is often about 0.01 to about 5.0 mole percent and preferably about 0.02 to about 2.0 mole percent and most preferably about 0.2 to about 0.5 mole percent based on total moles of monomer units of oligomer, including all ranges subsumed therein.

The following examples are provided to further illustrate and facilitate and understanding of the instant invention. The products obtained may be confirmed by conventional techniques such as proton and carbon-13 nuclear magnetic resonance spectroscopy, mass spectroscopy, infrared spectroscopy and GPC analysis.

EXAMPLE 1

A reaction flask with mechanical stirrer was charged with 100 g of macrocyclic polyester oligomer (Mn value of approximately 800 as determined by GPC analysis) and 0.5 g of antimony oxide in powder form. The contents were stirred, and heated to about 185° C. via an oil bath to produce a melt mixture. To the melt mixture was added 0.85 mL (0.3 mole %) of titanium(IV) 2-ethylhexoxide producing a reaction mixture. The reaction mixture was stirred and polymer formed within about 10 seconds (approximately 98% yield).

EXAMPLE 2

Example 2 was prepared in a manner similar to the one described in example 1 except that no nucleating agent was added. Polymer (approximately 98% yield) was produced.

EXAMPLE 3

Example 3 was prepared in a manner similar to the one described in example 1 except that 0.5 g of poly(1,4-butylene terephthalate) fibers were used as a nucleating agent in lieu of antimony oxide. Polymer (approximately 98% yield) was produced.

The data in the table below depicts the unexpected and improved crystallization rates of the polyesters formed via the process described in this invention.

TABLE

| Example[a] | Nucleating Agent | Approximately 100% Polymer Crystallization (min)[b] |
|---|---|---|
| 1 | Antimony oxide | 4 |
| 2 | None | 10 |
| 3 | PBT fibers | 3 |

[a]Examples 1, 2 and 3 correspond to the examples prepared above
[b]The crystallization rate was determined by calorimetry and by plotting time vs. temperature since the crystallization process is one which is exothermic.

What is claimed is:

1. A process for making polyesters comprising the step of reacting:
   (a) at least one macrocyclic polyester oligomer;
   (b) a polymerization catalyst; and
   (c) about 0.01–5.0% by weight, based on said oligomer, of a fibrous nucleating material.

2. A process in accordance with claim 1 wherein said macrocyclic polyester oligomer is a poly(alkylene dicarboxylate) oligomer.

3. A process in accordance with claim 2 wherein said poly(alkylene dicarboxylate) oligomer is macrocyclic poly(1,2-ethylene terephthalate), poly(1,4-butylene terephthalate) or poly(1,2-ethylene-2,6-naphthalene dicarboxylate).

4. A process in accordance with claim 1 wherein said polymerization catalyst is an organotin compound or a titanate compound.

5. A process in accordance with claim 4 wherein said polymerization catalyst is a dialkyltin(IV) oxide, acyclic and cyclic dialkyltin(IV) dialkyloxide, isopropyltitanate, 2-ethylhexyltitanate, tetrakis-(2-ethylhexyl)titanate, stannaoxacycloalkane, titanium(IV) 2-ethylhexoxide or a spirotin compound.

6. A process in accordance with claim 1 wherein said nucleating material is a polymer.

7. A process in accordance with claim 6 wherein said polymer is poly(1,4-butylene terephthalate).

8. A process in accordance with claim 1 wherein said polymerization catalyst is present in an amount of about 0.01 mole percent to about 5.0 mole percent based on total moles of monomer units of macrocyclic polyester oligomer.

* * * * *